(12) United States Patent
Tan et al.

(10) Patent No.: US 12,277,179 B2
(45) Date of Patent: Apr. 15, 2025

(54) DOCUMENT SHARING PROCESSING METHOD, APPARATUS, DEVICE, MEDIUM, AND SYSTEM

(71) Applicant: BEIJING BYTEDANCE NETWORK TECHNOLOGY CO., LTD., Beijing (CN)

(72) Inventors: Zhiyuan Tan, Beijing (CN); Tianren Zhong, Beijing (CN); Jingkang Zhong, Beijing (CN); Yingying Zhang, Beijing (CN); Jian Liu, Beijing (CN); Qiuhang Tan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/931,716

(22) Filed: Sep. 13, 2022

(65) Prior Publication Data

US 2023/0010855 A1 Jan. 12, 2023

Related U.S. Application Data

(63) Continuation of application No. 17/711,022, filed on Mar. 31, 2022, which is a continuation of application No. PCT/CN2021/101278, filed on Jun. 21, 2021.

(30) Foreign Application Priority Data

Jun. 28, 2020 (CN) .......................... 202010600546.6

(51) Int. Cl.
*G06F 16/93* (2019.01)
*G06F 3/0482* (2013.01)
(Continued)

(52) U.S. Cl.
CPC ............ *G06F 16/94* (2019.01); *G06F 3/0482* (2013.01); *G06F 16/176* (2019.01);
(Continued)

(58) Field of Classification Search
CPC ........ G06F 16/94; G06F 16/93; G06F 16/176; G06F 16/1767; G06F 21/6209; G06F 21/62

See application file for complete search history.

(56) References Cited

U.S. PATENT DOCUMENTS 8,666,759 B2 3/2014 Eckert et al.
9,565,175 B1 * 2/2017 Saylor ..................... H04W 4/12
(Continued)

FOREIGN PATENT DOCUMENTS

CN 1928867 A 3/2007
CN 103095642 A 5/2013
(Continued)

OTHER PUBLICATIONS

International Patent Application No. PCT/CN2021/101278 International Search Report mailed Sep. 13, 2021, with English language translation (5 pages).

(Continued)

*Primary Examiner* — Esther B. Henderson

(57) ABSTRACT

Embodiments of the present disclosure disclose document sharing processing method, apparatus, device, medium and system. The method includes: displaying, in an email interface, hyperlink information of a sharable document and an authority control entry of the sharable document; and acquiring authority data for the sharable document determined by a first user based on the authority control entry; where the authority data is used to determine a second user's operation authority data for the sharable document. According to the embodiments of the present disclosure, the hyperlink infor- (Continued)

mation of the sharable document and the authority control entry of the sharable document can be displayed in the email interface, and the first user can determine the authority data for the sharable document through the authority control entry, thereby enriching the controllable function for the sharable document in the email, and fulfilling users' document sharing requirements.

18 Claims, 9 Drawing Sheets

(51) Int. Cl.
  *G06F 16/176* (2019.01)
  *G06F 21/60* (2013.01)
  *G06F 21/62* (2013.01)
  *H04L 51/42* (2022.01)

(52) U.S. Cl.
  CPC ........ *G06F 21/604* (2013.01); *G06F 21/6209* (2013.01); *H04L 51/42* (2022.05)

(56) References Cited

U.S. PATENT DOCUMENTS

| | | | |
|---|---|---|---|
| 9,747,460 | B1 | 8/2017 | Kursun |
| 10,230,731 | B2 | 3/2019 | Weaver et al. |
| 10,749,831 | B2 * | 8/2020 | Zhong .................... H04L 51/08 |
| 2002/0083147 | A1 | 6/2002 | Ripperger |
| 2005/0149851 | A1 * | 7/2005 | Mittal .................. G06F 16/9558 707/E17.116 |
| 2006/0069990 | A1 | 3/2006 | Yozell-Epstein et al. |
| 2009/0107265 | A1 | 4/2009 | Parker, II et al. |
| 2011/0060804 | A1 | 3/2011 | Alfke |
| 2011/0276897 | A1 | 11/2011 | Crevier et al. |
| 2013/0297559 | A1 * | 11/2013 | Bailor ................. G06F 21/6227 707/608 |
| 2014/0215568 | A1 | 7/2014 | Kirigin et al. |
| 2015/0154156 | A1 | 6/2015 | Meyers, Jr. et al. |
| 2016/0065546 | A1 | 3/2016 | Krishna |
| 2016/0328570 | A1 * | 11/2016 | Chao .................. G06F 21/6209 |
| 2017/0006009 | A1 | 1/2017 | Hessler |
| 2017/0315677 | A1 | 11/2017 | Rice et al. |
| 2018/0041455 | A1 | 2/2018 | Uraizee et al. |
| 2019/0012053 | A1 | 1/2019 | Hawa et al. |
| 2021/0141938 | A1 | 5/2021 | Carter |

FOREIGN PATENT DOCUMENTS

| | | |
|---|---|---|
| CN | 103188126 A | 7/2013 |
| CN | 103907110 A | 7/2014 |
| CN | 104753771 A | 7/2015 |
| CN | 109684867 A | 4/2019 |
| CN | 110348236 A | 10/2019 |
| CN | 110475377 A | 11/2019 |
| CN | 111817946 A | 10/2020 |
| JP | 2007328471 A | 12/2007 |

OTHER PUBLICATIONS

Chinese Patent Application No. 202010600546.6 First Office Action, with English language translation (21 pages).
Chinese Patent Application No. 202010600546.6 Second Office Action, with English language translation (21 pages).
Chinese Patent Application No. 202010600546.6 Third Office Action, with English language translation (9 pages).
Chinese Patent Application No. 202010600546.6 Notice of Allowance (3 pages).
Office Action issued Mar. 17, 2023 in Indian Application No. 202227069716, with English translation (10 pages).
Notice of Reasons for Refusal issued Jul. 11, 2023 in Japanese Application No. 2022-574529, with English translation (15 pages).
Extended European Search Report and Search Opinion issued Sep. 18, 2023 in European Application No. 21832447.3 (9 pages).
Decision on Registration issued Sep. 21, 2023 in Korean Application No. 10-2022-7042173, with English translation (6 pages).
Final Office Action dated Apr. 25, 2024 in U.S. Appl. No. 17/711,022 (15 pages).
Non-Final Office Action dated Feb. 15, 2024 in U.S. Appl. No. 17/711,022 (24 pages).
Final Office Action dated Aug. 8, 2024 in U.S. Appl. No. 17/711,022 (10 pages).
Notice of Reasons for Refusal for Japanese Application No. 2022-574529, mailed Dec. 24, 2024, 15 pages.
Communication pursuant to Article 94(3) EPC for European Application No. 21832447.3, mailed Nov. 12, 2024, 5 pages.
Final Office Action for U.S. Appl. No. 17/711,022, mailed Nov. 21, 2024, 12 pages.

* cited by examiner

Receiver:

Subject:

Sans-Serif ∨   Normal ∨

Email Team communication record-date from 2020.6.18

DOCUMENT SHARING PROCESSING METHOD, APPARATUS, DEVICE, MEDIUM, AND SYSTEM

CROSS-REFERENCE TO RELATED APPLICATIONS

The present application is a continuation of U.S. application Ser. No. 17/711,022, filed on Mar. 31, 2022. U.S. application Ser. No. 17/711,022 is a continuation of International Application No. PCT/CN2021/101278, filed on Jun. 21, 2021, which claims priority to Chinese Patent Application No. 202010600546.6, filed on Jun. 28, 2020. All of the above applications are incorporated herein by reference in their entireties.

TECHNICAL FIELD

Embodiments of the present disclosure relate to computer data processing technologies, and in particular, to a document sharing processing method, an apparatus, a device, a medium, and a system.

BACKGROUND

A cooperative office is a specific demand for collective collaborative work at present, and also imposes new service requirements for office software used for achieving office automation. In cooperative office software, document sharing is a solution to match requirements for the cooperative office.

A sharable document may be shared or viewed by means of a hyperlink, and the hyperlink of the sharable document may be added in an email for receivers to access the document based on the hyperlink of the sharable document.

The conventional controllable function for a sharable document in an email is unitary, which cannot fulfill users' document sharing requirements.

SUMMARY

The embodiments of the present disclosure provide a document sharing processing method, an apparatus, a device, a medium and a system to enrich a controllable function for a sharable document in an email and fulfill users' document sharing requirements.

In a first aspect, an embodiment of the present disclosure provides a document sharing processing method, including:
displaying, in an email interface, hyperlink information of a sharable document and an authority control entry of the sharable document; and
acquiring authority data for the sharable document determined by a first user based on the authority control entry; where the authority data is used to determine a second user's operation authority data for the sharable document.

In a second embodiment, an embodiment of the present disclosure further provides a document sharing processing method, including:
receiving an email sent by a first user;
acquiring, according to a hyperlink of a sharable document in the email, document data corresponding to a second user's authority data for the sharable document; and
displaying, in an email reading interface, associated display content of the hyperlink of the sharable document according to the document data.

In a third aspect, an embodiment of the present disclosure further provides a document sharing processing method, including:
receiving an authority editing request for a sharable document initiated by an email client, where the authority editing request is input based on an authority control entry of the sharable document displayed in an email interface; and
updating authority data of the sharable document according to authority data in the authority editing request.

In a fourth aspect, an embodiment of the present disclosure further provides a document sharing processing apparatus, including:
a control entry displaying module, configured to display, in an email interface, hyperlink information of a sharable document and an authority control entry of the sharable document; and
an authority data acquiring module, configured to acquire authority data for the sharable document determined by a first user based on the authority control entry; where the authority data is used to determine a second user's operation authority data for the sharable document.

In a fifth aspect, an embodiment of the present disclosure further provides a document sharing processing apparatus, including:
an email receiving module, configured to receive an email sent by a first user;
a document data acquiring module, configured to acquire, according to a hyperlink of a sharable document, document data corresponding to a second user's authority data for the sharable document; and
a document data displaying module, configured to display, in an email reading interface, associated display content of the hyperlink of the sharable document according to the document data.

In a sixth aspect, an embodiment of the present disclosure further provides a document sharing processing apparatus, including:
a request receiving module, configured to receive an authority editing request for a sharable document initiated by an email client, where the authority editing request is input based on an authority control entry of the sharable document displayed in an email interface; and
an authority updating module, configured to update authority data of the sharable document according to authority data in the authority editing request.

In a seventh aspect, an embodiment of the present disclosure further provides an electronic device, including:
one or more processors; and
a memory configured to store one or more programs,
where the one or more programs, when executed by the one or more processors, cause the one or more processors to implement the document sharing processing method according to an embodiment of the present disclosure.

In an eighth aspect, an embodiment of the present disclosure further provides a computer readable storage medium on which a computer program is stored, where the document sharing processing method according to an embodiment of the present disclosure is implemented when the computer program is executed by a processor.

In a ninth aspect, an embodiment of the present disclosure further provides a computer program product including a computer program, where the document sharing processing method according to an embodiment of the present disclosure is implemented when the computer program is executed by a processor.

In a tenth aspect, an embodiment of the present disclosure further provides a computer program, where the document sharing processing method according to an embodiment of the present disclosure is implemented when the computer program is executed by a processor.

In an eleventh aspect, an embodiment of the present disclosure further provides a document sharing processing system, including: an email sender client, a document server and an email recipient client, where:

the email sender client is configured to, display, in an email interface, hyperlink information of a sharable document and an authority control entry of the sharable document; and acquire authority data for the sharable document determined by a first user based on the authority control entry; where the authority data is used to determine a second user's operation authority data for the sharable document;

the email sender client is further configured to send, to the document server to which the sharable document belongs, an authority editing request determined based on the authority data;

the document server is configured to update, according to the authority data in the authority editing request, the second user's operation authority type for the sharable document recorded by the document server;

the email sender client is further configured to send an email edited through the email interface to the second user;

the email recipient client is configured to receive the email sent by the first user;

the email recipient client is further configured to request to the document server, according to a hyperlink of the sharable document, for acquisition of document data corresponding to the second user's authority data for the sharable document;

the document server is configured to query, according to the requesting from the email recipient client, the second user's authority data for the sharable document, acquire the corresponding document data according to the authority data, and feedback same to the email recipient client; and the email recipient client is further configured to display, in an email reading interface, associated display content of the hyperlink of the sharable document according to the document data.

According to the embodiments of the present disclosure, the hyperlink information of the sharable document and the authority control entry of the sharable document can be displayed in the email editing interface, and the sender user can determine the authority data for the sharable document through the authority control entry, thereby solving the problem in the prior art that a controllable function for a sharable document in an email is unitary, enriching the controllable function for the sharable document in the email, and fulfilling users' document sharing requirements.

BRIEF DESCRIPTION OF DRAWINGS

The aforementioned and other features, advantages and aspects of various embodiments of the present disclosure will become more apparent in conjunction with the accompanying drawings and with reference to the following description of embodiments.

Throughout the drawings, the same or similar reference numerals represent the same or similar elements. It should be appreciated that the drawings are schematic, and components and elements are not necessarily drawn to scale.

DESCRIPTION OF EMBODIMENTS

Figure 1:
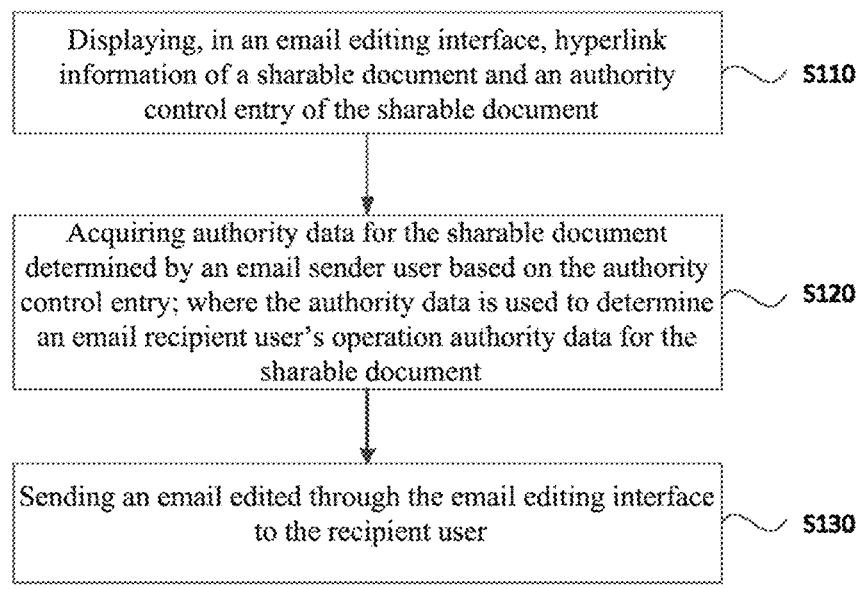
FIG. 1 is a flowchart of a document sharing processing method provided in Embodiment 1 of the present disclosure.

Embodiments of the present disclosure will be described in more detail hereunder with reference to the accompanying drawings. Although some embodiments of the present disclosure are shown in the drawings, it should be appreciated that the present disclosure may be implemented in various forms and should not be construed as being limited to the embodiments set forth herein, instead these embodiments are provided for a more thorough and comprehensive understanding of the present disclosure. It should be appreciated that the drawings and the embodiments of the present disclosure are only for exemplary purposes, but are not intended to limit the protection scope of the present disclosure.

It should be appreciated that various steps recorded in method embodiments of the present disclosure may be performed in different orders and/or in parallel. Furthermore, the method embodiments may include additional steps and/or may omit to perform the illustrated steps. The scope of the present disclosure is not limited in this regard.

The term "include" and variations thereof as used herein are open-ended inclusions, that is, "including but not limited to". The term "based on" means "based at least in part on". The term "an embodiment" means "at least one embodiment"; the term "another embodiment" means "at least one additional embodiment"; and the term "some embodiments" means "at least some embodiments". Relevant definitions of other terms will be given in the following description.

It is to be noted that concepts such as "first" and "second" mentioned in the present disclosure are only used to distinguish different apparatuses, modules or units, but are not used to limit the order or the interdependence of functions performed by these apparatuses, modules or units.

It is to be noted that the modifications "a(n)" and "multiple" mentioned in the present disclosure are illustrative rather than restrictive, and those skilled in the art should appreciated that such modifications should be interpreted as "one or more" unless explicitly indicated in the context otherwise.

The names of messages or information exchanged between multiple apparatuses in the embodiments of the present disclosure are only for illustrative purposes, but are not intended to limit the scope of these messages or information.

Embodiment 1

FIG. 1 is a flowchart of a document sharing processing method provided in Embodiment 1 of the present disclosure. This embodiment is applicable to a situation where a sender user determines authority data for a sharable document in an email editing interface. The method may be performed by a document sharing processing apparatus, and the apparatus may be implemented by means of software and/or hardware and configured on an email sender client, where the email sender client may be a webpage capable of logging in to a mailbox, or a client with an application. As shown in FIG. 1, the method specifically includes the following steps.

S110, displaying, in an email interface, hyperlink information of a sharable document and an authority control entry of the sharable document.

The email editing interface may be an interface capable of allowing a user to perform an editing operation on email content, for example, through the email editing interface, it is able to create a new email, reply an email, or forward an email and the like. The hyperlink information of the sharable document may be of any feasible representation. The user may skip to a document page indicated by a hyperlink of the sharable document by performing an operation such as clicking on the hyperlink information of the sharable document. In some implementations, the hyperlink information of the sharable document may be, for example, the hyperlink itself, that is, a URL (Uniform Resource Locator) string. Alternatively, in some other implementations, the hyperlink information of the sharable document may also be an anchor text link. In these implementations, the text in the anchor text link may be information extracted from the sharable document according to a certain rule, for example, the title of the sharable document. Thereby, the user can know a part of the content in the sharable document without the necessity of clicking on the link. The authority control entry may be an entry that the user controls through input, and a recipient user's authority for the sharable document may be controlled through the authority control entry. The provision of the authority control entry enriches a controllable function for the sharable document in the email, and fulfills users' document sharing requirements.

S120, acquiring authority data for the sharable document determined by a first user based on the authority control entry; where the authority data is used to determine a second user's operation authority data for the sharable document.

In the embodiment of the present disclosure, there may be the following two application scenarios: a draft email co-editing scenario and an email sharing scenario. In the draft email co-editing scenario, the first user may be a co-editing initiator who sends a document link to a draft email, and the second user may be a co-editing recipient; in the email sharing scenario, the first user may be a co-editing initiator who performs sharing on an email, and the second user may be a co-editing recipient to whom the sharing is performed. That is, the first user may be a sender user of the email, and the second user may be a recipient user of the email.

The operation authority data may include an operation authority type for the sharable document. The operation authority type may include a reading authority, a sharing authority, an editing authority and the like. During the application, authority levels may also be set for different operation authorities, for example, the editing authority, the sharing authority and the reading authority have sequentially decreased priorities. An operation authority having a higher priority may also be enabled with an operation authority having a lower priority. For example, if a sender user has the editing authority, it means that the sender user not only has the editing authority, but also simultaneously has the sharing authority and the reading authority. Similarly, if the sender user has the sharing authority, the sender user simultaneously has the reading authority but does not have the editing authority, since the editing authority has a higher priority than the sharing authority. The operation authority data may also include an operation authority object for the sharable document, e.g., a recipient user. There may be one or more recipient users, and the recipient users may include a receiver and may also include a carbon copy receiver. If there are multiple recipient users, the acquiring the authority data for the sharable document determined by the sender user based on the authority control entry includes: setting a same operation authority type for the respective recipient users based on the sender user's operation on the authority control entry; or setting operation authority types for the respective recipient users respectively based on the sender user's operations on the authority control entry that respectively correspond to the respective recipient users. When multiple recipient users are contained, one operation authority type may be determined for each of the recipient users, or one operation authority type may be determined uniformly for all the recipient users. It will be appreciated that in some implementations, the authority data may also include other data related to authority control, such as an authority validity period, an authority expiration condition and the like.

Taking the operation authority data including the operation authority type as an example, in an implementation, the operation authority type may be determined through the authority control entry, and the operation authority object may be determined through a recipient column. Specifically, determining, according to a recipient column of the email, the recipient user, for use as an operation authority object; acquiring an operation authority type for the sharable document determined by the email sender user based on the authority control entry; and determining the authority data according to the operation authority object and the operation authority type.

The recipient columns may include a receiver column and a carbon copy receiver column, and recipient users, that is, the operation authority objects, may be determined according to email addresses in the receiver column and the carbon copy receiver column. The sender user may input an operation authority type in the authority control entry, or select from operation authority types provided by the authority control entry. The email sender client acquires an operation authority type based on information input or selected by the sender user at the authority control entry, and then obtain authority data based on the operation authority objects and the operation authority type. The operation authority object and the operation authority type are not limited in this embodiment with regard to their acquiring sequence. For example, the operation authority object may be acquired first, or the operation authority type may be acquired first, or the operation authority object and the operation authority type may be acquired simultaneously.

In another implementation, the operation authority object and the operation authority type may also be determined through the authority control entry. Specifically, acquiring an operation authority type and an operation authority object for the sharable document determined by the email sender user based on the authority control entry, for use as the authority data.

In such an implementation, both the operation authority type and the operation authority object are determined through the authority control entry. For example, the authority control entry may include an operation authority type entry and an operation authority object entry. The operation authority type may be acquired through the operation authority type entry, and the operation authority object may be acquired through the operation authority object entry. Definitely, the authority control entry may also include one entry, which includes an operation authority type and an operation authority object corresponding to the operation authority type.

S130, sending an email edited through the email interface to the second user.

In this embodiment, the email sender client may send an email edited through the email editing interface to an email server, and the email server sends it to an email recipient client corresponding to a recipient user. Among them, the email sent by the email sender client carries the hyperlink information of the sharable document. Similar to the email sender client, the email recipient client may be a webpage capable of logging in to a mailbox, or a client with an application. The email server may be a device responsible for sending and receiving management of emails, such as an email server. The email sender client and the email recipient client may change into each other in different scenarios, and the case is similar for the recipient user and the sender user. For example, when a user is sending, sharing or forwarding an email, the corresponding client is an email sender client, and the user is a sender user; when the user is receiving an email, the email sender client changes into an email recipient client, and the user changes into a recipient user at this point. In this embodiment, the sender user and the recipient user may be a set of user groups belonging to the same operator and service provider, that is, the sender user and the recipient user can access part of or all of sharable documents on the document server.

According to the document sharing processing method provided in the embodiment of the present disclosure, the hyperlink information of the sharable document and the authority control entry of the sharable document can be displayed in the email editing interface, and the sender user can determine the authority data for the sharable document through the authority control entry, thereby solving the problem in the prior art that a controllable function for a sharable document in an email is unitary, achieving setup of the recipient user's authority in the email, enriching the controllable function for the sharable document in the email, and fulfilling users' document sharing requirements.

On the basis of the above embodiment, before the displaying, in the email editing interface, the hyperlink information of the sharable document and the authority control entry of the sharable document, the document sharing processing method may further include:

entering the email editing interface through a user's triggering of a mailbox card entry in an instant messaging interface.

A mailbox card is embedded in the instant messaging interface, so that the user may conveniently use a mailbox service through the instant messaging interface. For example, in some application scenarios, the user may enter the mailbox interface by clicking the mailbox card. Operations that the user performs on the mailbox interface may be similar to the operations that the user performs using a mailbox client. Correspondingly, content presented in the mailbox interface may also be similar to the content presented by the mailbox client. For example, the mailbox interface may present at least one of the following: an inbox, an outbox, a draft box, an email editing interface and the like. Alternatively, the user may switch between at least one of the above through certain operations.

Figure 2:
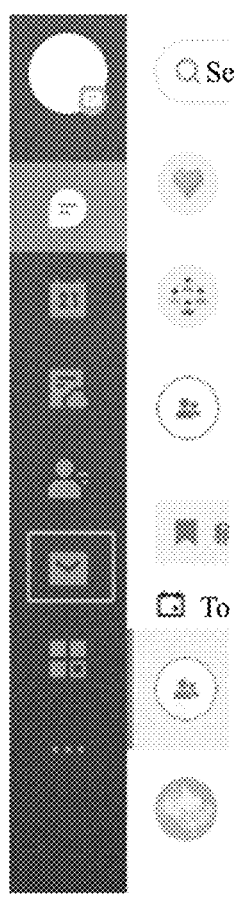
FIG. 2 is a schematic diagram of a mailbox card entry provided in Embodiment 1 of the present disclosure.

That is, as shown in FIG. 2 which is a schematic diagram of a mailbox card entry provided in Embodiment 1 of the present disclosure, the mailbox card entry may be added in the instant messaging interface, so that a user may conveniently open the interface of the email client through the mailbox card entry if in a desire to read and write an email during an instant messaging process.

Embodiment 2

Figure 3:
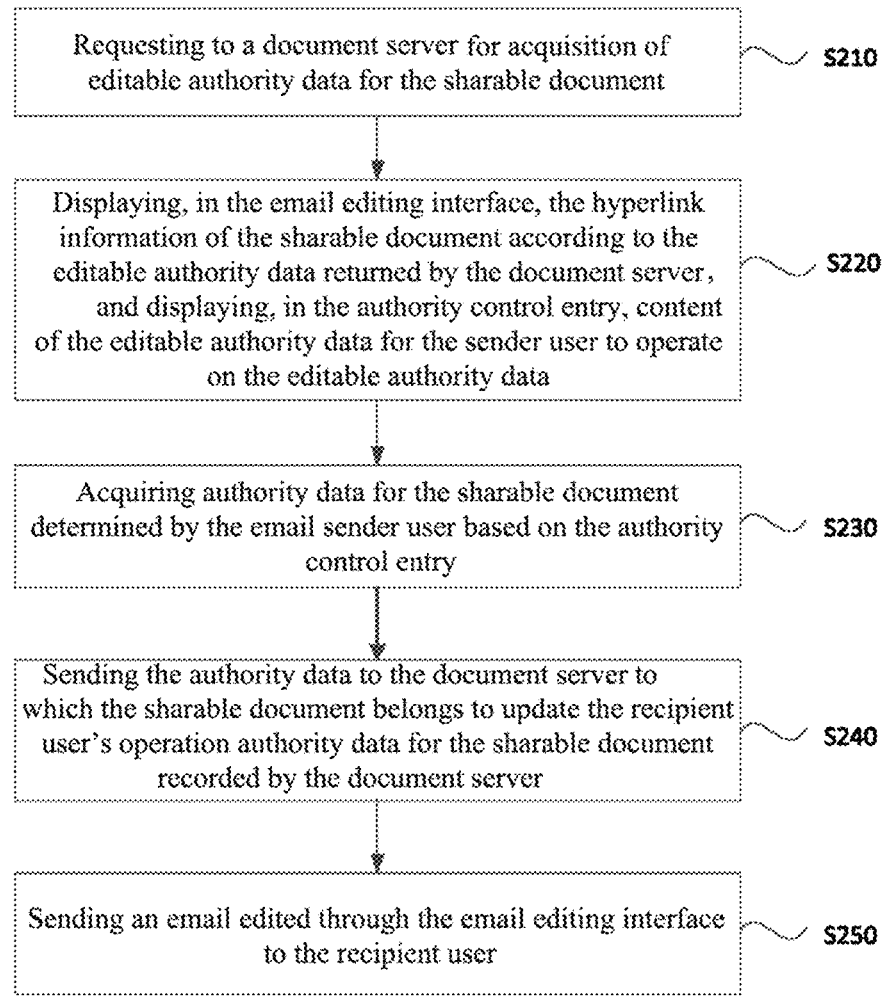
FIG. 3 is a flowchart of a document sharing processing method provided in Embodiment 2 of the present disclosure.

FIG. 3 is a flowchart of a document sharing processing method provided in Embodiment 2 of the present disclosure. The method is applied to the email sender client. With reference to FIG. 3, the method may include the following steps.

S210, requesting to a document server for acquisition of editable authority data of the sharable document.

The document server may be a device that manages documents, such as a document server, which is configured to support various functions of a sharable document, and also to manage a user's authority for the sharable document. Specifically, the document server in this embodiment may manage authority of a recipient user corresponding to the sharable document. The editable authority data may be authority data operable by a sender user in the authority control entry. The recipient user's at least one operation authority type for the sharable document may be included in this embodiment. The editable authority data may include editable authority data of one or more recipient users. The editable authority data conferrable to the recipient user may be the authority for the sharable document held by the sender user, or the authority conferred to the recipient user within the sender user's authority competence.

In this embodiment, the email sender client may request to the document server for acquisition of the editable authority data of the sharable document upon detection of a hyperlink of the sharable document in the email editing interface; or request to the document server for acquisition of the editable authority data of the sharable document upon detection of an edit activating operation on the authority control entry, where the edit activating operation on the authority control entry may be to click the authority control entry and prepare to start inputting.

S220, displaying, in the email interface, the hyperlink information of the sharable document according to the editable authority data returned by the document server, and displaying, in the authority control entry, content of the editable authority data for the first user to operate the editable authority data.

In this embodiment, the first user may be a sender user of the email, and the second user may be a recipient user of the email. The authority control entry may be a control displayed in association with the hyperlink information of the sharable document, and the control is configured to input the authority data, and may also be configured to confirm preset default authority data, where the preset default authority data includes the recipient user's access authority for the sharable document. That is to say, the sender user does not change the recipient user's authority for the sharable document. The authority control entry is not limited in this embodiment with regard to its specific form, for example, it may include at least one of the following: an option control, an input box, a button, a text display box and the like.

Figure 4:
FIG. 4 is a schematic diagram of an editable email interface provided in Embodiment 2 of the present disclosure.
Figure 4:
Figure 4:
Figure 4:
Figure 4:
Figure 4:
Figure 4:
Figure 4:
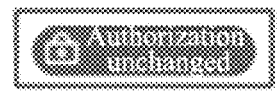

Exemplarily, reference may be made to FIG. 4 which is a schematic diagram of an editable email interface provided in Embodiment 2 of the present disclosure. The editable email interface includes a receiver, a subject, hyperlink information of a sharable document, and an authority control entry, where the hyperlink information of the sharable document is title content of the sharable document, that is, "Email Team communication record-date from 2020.6.18", content of the editable authority data displayed in the authority control entry is authorization unchanged, that is to say, the sender user does not make any change to the authority for the sharable document possessed by the recipient user.

S230, acquiring authority data for the sharable document determined by the first user based on the authority control entry.

S240, sending the authority data to the document server to which the sharable document belongs to update the second user's operation authority data for the sharable document recorded by the document server.

In this embodiment, the email sender client may directly send the authority data to the document server to which the sharable document belongs, or may first send the authority data to the email server and the email server forwards same to the document server to which the sharable document belongs. Specifically, in sending the authority data, the sending may be performed in real time, for example, the sending may be performed upon detection of inputting, by the sender user, the authority data to the current authority control entry; alternatively, the sending may be performed at once, for example, the sending is performed upon confirmation of sending the email to the recipient user, that is, upon detection of clicking, by the user, an email sending operation; alternatively, the sending may be performed upon detection of the user's clicking to save or system saving by default. The document server receives and records the authority data conferred to the recipient user, so as to subsequently perform authentication when the recipient user requests for acquiring data of the sharable document.

S250, sending an email edited through the email interface to the second user.

In the embodiment of the present disclosure, the email sender client can display, based on the editable authority data fed back by the document server, the hyperlink information of the sharable document and a control displayed in association with the hyperlink information of the sharable document in the email editable interface, where content of the editable authority data can be displayed in the control for the sender user to operate, so as to fulfill the sender user's document sharing requirements, and meanwhile the sender user's acquired authority data for the sharable document may also be sent to the document server to timely update the authority data for the sharable document recorded by the document server, thereby protecting the sharing of the sharable document from being affected due to the inability to timely update the recipient user's authority data recorded by the document server.

Embodiment 3

Figure 5:
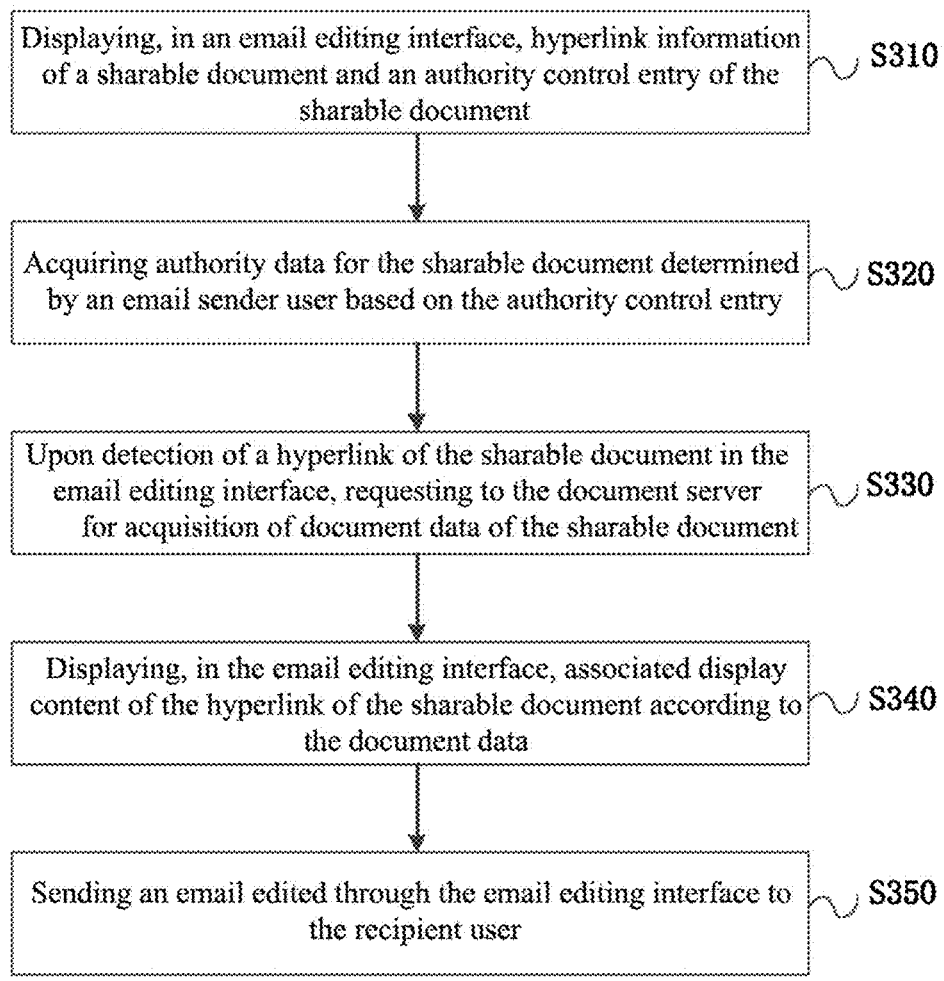
FIG. 5 is a flowchart of a document sharing processing method provided in Embodiment 3 of the present disclosure.

FIG. 5 is a flowchart of a document sharing processing method provided in Embodiment 3 of the present disclosure. The method is applied to the email sender client. With reference to FIG. 5, the method may include the following steps.

S310, displaying, in an email interface, hyperlink information of a sharable document and an authority control entry of the sharable document.

S320, acquiring authority data for the sharable document determined by a first user based on the authority control entry.

S330, upon detection of a hyperlink of the sharable document in the email interface, requesting to the document server for acquisition of document data of the sharable document.

In this embodiment, the first user may be a sender user of an email, and the second user may be a recipient user of the email. The document data in this embodiment may be acquired before the editable authority data in the aforementioned embodiments, or may be acquired after the editable authority data, or may be acquired with the editable authority data simultaneously. For example, upon detection of a hyperlink of the sharable document in the email editing interface, requesting to the document server for acquisition of both the editable authority data and the document data. In one example, the document data may include basic document information and/or document summary data, where the basic document information may include, but is not limited to, the author, the time, the field and the like of the document. In another example, the document data may include document content data, and the document content may be the entire content of the document. In another example, the document data may include document title data, and the document title can help the user to get knowledge of the document quickly.

S340, displaying, in the email interface, associated display content of the hyperlink of the sharable document according to the document data.

Figure 6:
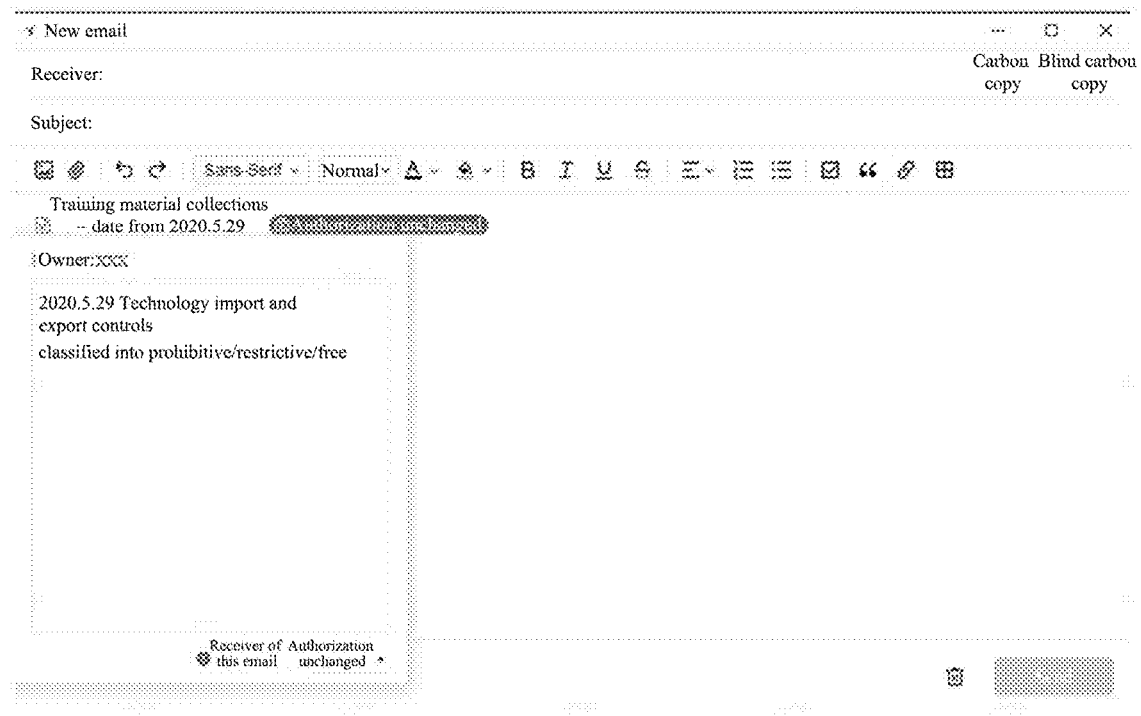
FIG. 6 is a schematic diagram of a document data previewing indication provided in Embodiment 3 of the present disclosure.

The associated display content of the hyperlink of the sharable document may be displayed in a manner that varies with the document data. In an implementation, when the document data includes basic document information and/or document summary data, a preview display may be performed, for example, upon detection of the recipient user's previewing indication for the hyperlink of the sharable document, displaying the basic document information and/or the document summary data in the email editing interface, for use as preview content. The previewing indication may be acquired through a mouse. For example, when it is detected that the mouse hovers over the hyperlink of the sharable document, a previewing indication is acquired, and the basic document information and/or the document summary data of the sharable document corresponding to the hyperlink of the sharable document is displayed in the email editing interface, as preview content for the sender user to preview. Exemplarily, reference may be made to FIG. 6 which is a schematic diagram of a document data previewing indication provided in Embodiment 3 of the present disclosure. When the mouse hovers over the hyperlink of the sharable document, the document summary data is exemplarily displayed for the user to preview.

Figure 7:
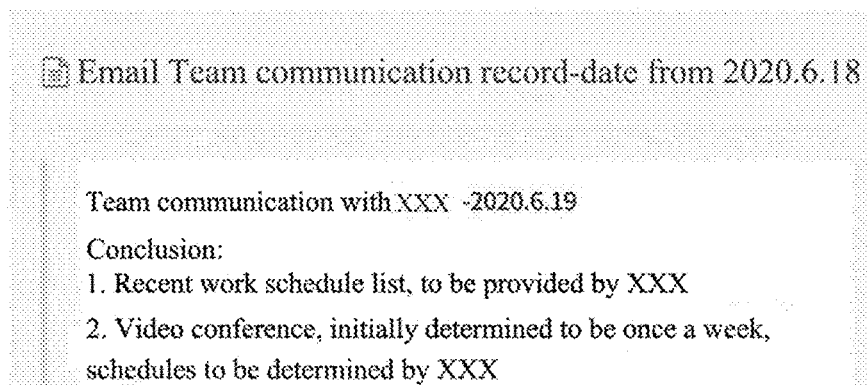
FIG. 7 is a schematic diagram of a document data reading indication provided in Embodiment 3 of the present disclosure.

In another implementation, when the document data includes document content data, the document content may be displayed for the sender user to read or edit. For example, upon detection of the sender user's reading indication or editing indication for the hyperlink of the sharable document, displaying a browsing interface or an editing interface of the document content data in the email editing interface. The reading indication or the editing indication may be acquired through the sender user's triggering operation on the hyperlink of the sharable document. For example, when it is detected that the sender user clicks the hyperlink of the sharable document, a reading indication or an editing indication is acquired, and a browsing interface or an editing interface of the document content data is displayed in the email editing interface for the sender user to read or edit. Exemplarily, reference may be made to FIG. 7 which is a schematic diagram of a document data reading indication provided in Embodiment 3 of the present disclosure. When the sender user clicks the hyperlink of the sharable document, the document content of the corresponding sharable document is exemplarily displayed.

In another implementation, when the document data includes document title data, the document title data may be directly displayed at the position of the hyperlink of the sharable document, for use as the associated display content of the hyperlink of the sharable document. As shown in FIG. 4, "Email Team communication record-date from 2020.6.18" is displayed, as the document title data, at the position of the hyperlink of the sharable document.

S350, sending an email edited through the email interface to the recipient user.

According to the document sharing processing method provided in the embodiment of the present disclosure, not only the operation authority data of the sharable document but also the document data of the sharable document can be displayed in the email editing interface, moreover, on the basis that contents of the document data are different, display contents and display manners thereof are also different, thereby enabling the sender user to get knowledge of the sharable document quickly.

Embodiment 4

Figure 8:
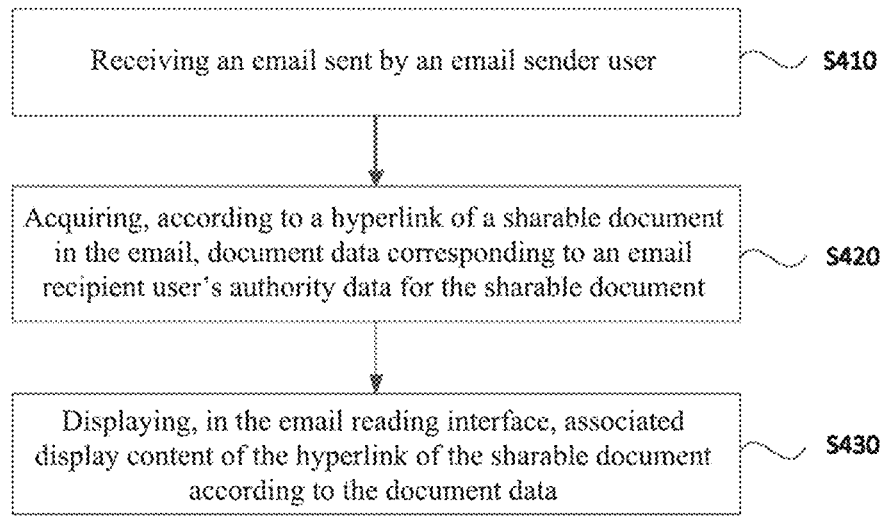
FIG. 8 is a flowchart of a document sharing processing method provided in Embodiment 4 of the present disclosure.

FIG. 8 is a flowchart of a document sharing processing method provided in Embodiment 4 of the present disclosure. This embodiment may be applied to a situation where associated display content of a hyperlink of a sharable document is displayed in an email reading interface. The method may be performed by a document sharing processing apparatus, and the apparatus may be implemented by means of software and/or hardware and configured on an email recipient client, where the email recipient client may be a webpage capable of receiving emails, or a client with an application. As shown in FIG. 8, the method specifically includes the following steps.

S410, receiving an email sent by a first user.

In this embodiment, the first user may be a sender user of the email, and the second user may be a recipient user of the email. The email received by the email recipient client contains the hyperlink of the sharable document.

S420, acquiring, according to a hyperlink of a sharable document in the email, document data corresponding to a second user's authority data for the sharable document.

In this embodiment, the email recipient client may request, based on the hyperlink of the sharable document in the received email, a document server to which the sharable document belongs to query and feedback the document data corresponding to the email recipient user's authority data for the sharable document. Among them, the email recipient client may directly request to the document server, or may send request information to an email server and the email server forwards same to the document server. The recipient user's authority data for the sharable document is queried and fed back by the document server. In one example, the document server may acquire the recipient user's pre-stored user information based on the hyperlink of the sharable document, and when the recipient user's user information matches the pre-stored user information, the document data corresponding to the recipient user's authority data for the sharable document may be fed back to the email recipient client.

S430, displaying, in the email reading interface, associated display content of the hyperlink of the sharable document according to the document data.

The email reading interface may be an interface in the email recipient client, on which email content can be read, for example, the document data of the sharable document may be previewed or read through the email reading interface. The associated display content of the hyperlink of the sharable document varies with the document data. For example, when the document data includes basic document information and/or document summary data, the displaying, in the email reading interface, the associated display content of the hyperlink of the sharable document according to the document data includes: upon detection of the recipient user's previewing indication for the hyperlink of the sharable document, displaying the basic document information and/or the document summary data in the email reading interface, for use as preview content. When the document data includes document content data, the displaying, in the email reading interface, the associated display content of the hyperlink of the sharable document according to the document data includes: upon detection of the recipient user's reading indication or editing indication for the hyperlink of the sharable document, displaying a browsing interface or an editing interface of the document content data in the email reading interface. When the document data includes document title data, the displaying, in the email reading interface, the associated display content of the hyperlink of the sharable document according to the document data includes: displaying, in the email reading interface, the document title data as the display content of the hyperlink of the sharable document. Reference may be made to the aforementioned embodiments for specific details, which will not be described here again.

The document sharing processing method provided in the embodiment of the present disclosure is applied to the email recipient client. The email recipient client can acquire the document data corresponding to the recipient user's authority data for the sharable document based on the hyperlink of the sharable document in the received email, and display the associated display content of the hyperlink of the sharable document in the email reading interface, so that the recipient user can acquire the corresponding document data within the competence of the authority queried by the document server, thereby fulfilling users' document sharing requirements.

On the basis of the aforementioned embodiments, the method may further include:

if the acquiring, according to the hyperlink of the sharable document, the second user's document data for the sharable document fails, sending a sharable document accessing request to a document server to which the sharable document belongs in response to a triggering operation on the hyperlink of the sharable document.

Specifically, the failure to acquire the recipient user's document data for the sharable document may be that the recipient user has no authority to acquire the document data of the sharable document. In one example, when determining that the recipient user's user information does not match the pre-stored user information, the document server may feedback, to the recipient client, result information indicating no authority, and demonstrate same to the recipient client through the email recipient client. After receiving the result information indicating no authority, the recipient user may send a sharable document accessing request to the document server to request for acquisition of an access authority. Among them, the access authority may be a reading authority, a sharing authority or an editing authority, and the sharable document accessing request may be acquired by the email recipient client through the hyperlink of the sharable document. For example, the email recipient client, upon detection of the user's triggering operation on the hyperlink of the sharable document, sends a sharable document accessing request to the document server. The user's triggering operation on the hyperlink of the sharable document may be a click on the hyperlink of the sharable document.

Embodiment 5

Figure 9:
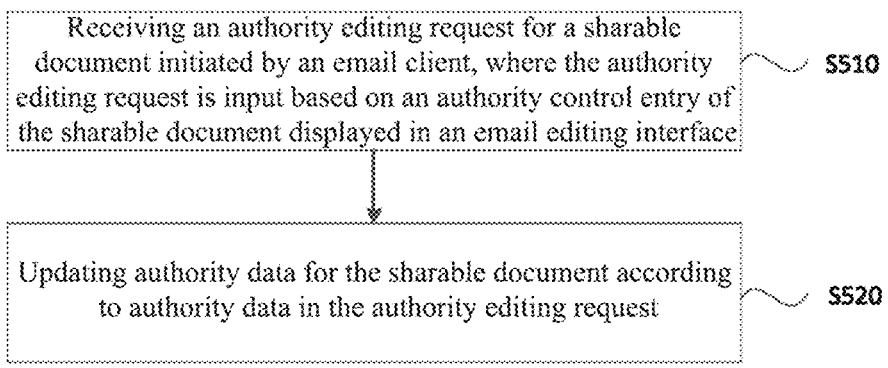
FIG. 9 is a flowchart of a document sharing processing method provided in Embodiment 5 of the present disclosure.

FIG. 9 is a flowchart of a document sharing processing method provided in Embodiment 5 of the present disclosure. This embodiment is applied to a situation where authority data of a sharable document is updated according to authority data sent by an email client. The method may be performed by a document sharing processing apparatus, and the apparatus may be implemented by means of software and/or hardware and configured on a document server. As shown in FIG. 9, the method specifically includes the following steps.

S510, receiving an authority editing request for a sharable document initiated by an email client, where the authority editing request is input based on an authority control entry of the sharable document displayed in an email interface.

The email client may be an email sender client. In an implementation, the email client, upon detection of its user's triggering operation on the authority control entry, sends an authority editing request to the document server. Among them, its user's triggering operation on the authority control entry may be a click on the authority control entry. In this embodiment, the email client may directly send the authority editing request to the document server, or may first send the authority editing request to an email server and the email server forward same to the document server. Specifically, in response to an email sending operation, an email sender client may directly send an authority updating request to the document server; alternatively, in response to an email sending operation, the email server may send an authority updating request to the document server.

It will be appreciated that the user to which the email client belongs generally needs to acquire editable authority data before sending the authority editing request to the document server, and the authority editing request is sent to the document server in case of possession of editable authority. Therefore, in the embodiment, before the authority editing request for the sharable document initiated by the email client is received, the editable authority data of the user corresponding to the authority editing request may also be determined. Correspondingly, before S510, the following steps may be further included:

receiving an editable authority data acquiring request for the sharable document initiated by the email client;

querying, according to a to-be-authorized user in the editable authority data acquiring request, the to-be-authorized user's authority data for the sharable document; and feeding back the authority data to the email client as editable authority data.

Specifically, the email client, upon detection of a hyperlink of the sharable document in the email editing interface or detection of an edit activating operation on the authority control entry, sends an editable authority data acquiring request to the document server, where the editable authority data acquiring request may include identity information of a to-be-authorized user; the document server acquires the to-be-authorized user's authority data for the sharable document according to the identity information of the to-be-authorized user, and feeds back same to the email client as the editable authority data for the user to operate. The to-be-authorized user includes a preset type of participants of the email. The participants include a co-editing initiator who sends a document link to a draft email and a co-editing recipient; alternatively, the participants include a sender user of the email and a recipient user of the email.

S520, updating authority data of the sharable document according to authority data in the authority editing request.

The authority data in this embodiment may include a user name and a user operation behavior, and may further include an authority validity period, that is, the authority data is valid within the authority validity period, and is invalid otherwise. The user name may be information that uniquely identifies a user identity, which for example may be an account name, a password and the like of a mailbox. The user operation behavior may be a behavior such as reading, editing, sharing and the like. Before updating the authority data of the sharable document, the document server in this embodiment may also verify the authority data in the authority editing request. Correspondingly, before S520, the following steps may be further included:

acquiring authority data of a user to which the email client belongs, and verifying whether the authority data in the authority editing request meets a preset condition; and triggering execution of updating the authority data of the sharable document if the authority data in the authority editing request meets the preset condition.

In a feasible implementation, the preset condition may be that the authority data in the authority editing request is within the authority competence of the authority data of the user to which the email client belongs. Exemplarily, the user to which the email client belongs is a sender user; and in this implementation, the sender user may authorize a recipient user within its own competence of authority. For example, the sender user has the editing authority, the editing authority, the sharing authority and the reading authority have sequentially decreased levels, when the recipient user has an authority no higher than the sender user, an update to the authority data of the sharable document is triggered in case of a detection that the authority data in the authority editing request is the editing authority, the sharing authority, or the reading authority. When the sender user has the reading authority while the recipient user has the editing authority or the sharing authority, no update is triggered in case of a detection that the authority data in the authority editing request is the reading authority, and result information indicating no authority is fed back to the sender user, that is to say, in case of a detection that the authority granted by the sender user to the receiver user is within authority competence of the sender user and the sender user has an authority no lower than that of the recipient user, an update to the authority data of the sharable document is triggered.

The document sharing processing method provided in the embodiment of the present disclosure is applied to the document server. The document server timely updates the authority data of the sharable document according to the authority data in the authority editing request for the sharable document initiated by the email client, so that the recipient user's authority data for the sharable document that is determined by the sender user is timely effective so as to fulfill the sender user's document sharing requirements.

Embodiment 6

Figure 10:
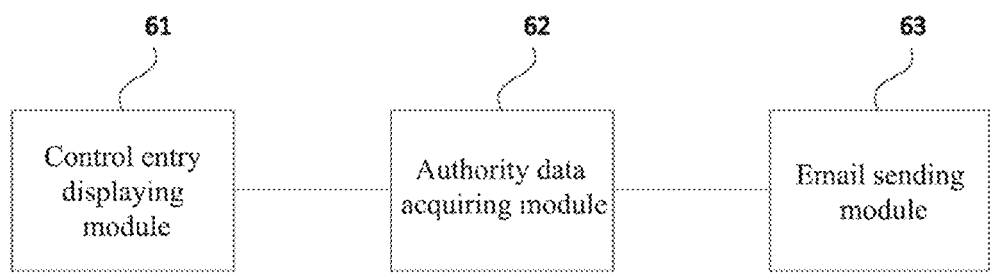
FIG. 10 is a structural diagram of a document sharing processing apparatus provided in Embodiment 6 of the present disclosure.

FIG. 10 is a structural diagram of a document sharing processing apparatus provided in Embodiment 6 of the present disclosure. The apparatus can perform the document sharing processing method in the aforementioned embodiments, and can be configured in an email sender client. As shown in FIG. 10, the apparatus may include:

a control entry displaying module 61, configured to display, in an email interface, hyperlink information of a sharable document and an authority control entry of the sharable document;

an authority data acquiring module 62, configured to acquire authority data for the sharable document determined by a first user based on the authority control entry; where the authority data is used to determine a second user's operation authority data for the sharable document; and an email sending module 63, configured to send an email edited through the email interface to the second user.

In this embodiment, the first user may be a sender user of the email, and the second user may be a recipient user of the email. The document sharing processing apparatus provided in the embodiment of the present disclosure can display, in the email editing interface, the hyperlink information of the sharable document and the authority control entry of the sharable document, and determine the recipient user's authority data for the sharable document through the authority control entry, thereby solving the problem in the prior art that a controllable function for a sharable document in an email is unitary, achieving setup of the recipient user's authority in the email, enriching the controllable function for the sharable document in the email, and fulfilling users' document sharing requirements.

On the basis of the aforementioned embodiments, the authority data acquiring module 62 is configured to:

determine, according to a recipient column of the email, the recipient user, for use as an operation authority object;

acquire an operation authority type for the sharable document determined by the email sender user based on the authority control entry; and determine the authority data according to the operation authority object and the operation authority type.

On the basis of the aforementioned embodiments, the authority data acquiring module 62 is configured to:

acquire an operation authority type and an operation authority object for the sharable document determined by the email sender user based on the authority control entry, for use as the authority data.

On the basis of the aforementioned embodiments, the apparatus further includes:

an authority data sending module, configured to: after the authority data for the sharable document determined by the email sender user based on the authority control entry is acquired, send the authority data to a document server to which the sharable document belongs to update the recipient user's operation authority data for the sharable document recorded by the document server.

On the basis of the aforementioned embodiments, the authority data sending module is specifically configured to:

send the authority data to the document server to which the sharable document belongs, when the sender user inputs the authority data to a current authority control entry or when the email is confirmed to be sent to the recipient user.

On the basis of the aforementioned embodiments, the authority control entry includes a control displayed in association with a hyperlink of the sharable document, and the control is configured to input the authority data.

On the basis of the aforementioned embodiments, the control is configured to confirm preset default authority data; where the preset default authority data includes the recipient user's access authority for the sharable document.

On the basis of the aforementioned embodiments, the control entry displaying module 61 includes:

an acquisition requesting unit, configured to request to a document server for acquisition of editable authority data of the sharable document; and a displaying unit, configured to display, in the email editing interface, the hyperlink information of the sharable document according to the editable authority data returned by the document server, and display, in the authority control entry, content of the editable authority data for the sender user to operate the editable authority data.

On the basis of the aforementioned embodiments, the acquisition requesting unit is specifically configured to:

upon detection of a hyperlink of the sharable document in the email editing interface or detection of an edit activating operation on the authority control entry, request to the document server for acquisition of the editable authority data of the sharable document.

On the basis of the aforementioned embodiments, the editable authority data includes the recipient user's at least one operation authority type for the sharable document; and the editable authority data includes editable authority data of one or more recipient users.

On the basis of the aforementioned embodiments, the apparatus further includes:

a document data acquiring module, configured to: upon detection of a hyperlink of the sharable document in the email editing interface, request to the document server for acquisition of document data of the sharable document; and an associated display content displaying module, configured to display, in the email editing interface, associated display content of the hyperlink of the sharable document according to the document data.

On the basis of the aforementioned embodiments, the document data includes basic document information and/or document summary data, and the associated display content displaying module is specifically configured to:

upon detection of the sender user's previewing indication for the hyperlink of the sharable document, display the basic document information and/or the document summary data in the email editing interface, for use as preview content.

On the basis of the aforementioned embodiments, the document data includes document content data, and the associated display content displaying module is specifically configured to:

upon detection of the sender user's reading indication or editing indication for the hyperlink of the sharable document, display a browsing interface or an editing interface of the document content data in the email editing interface.

On the basis of the aforementioned embodiments, the document data includes document title data, and the associated display content displaying module is specifically configured to:

display, in the email editing interface, the document title data as the associated display content of the hyperlink of the sharable document.

On the basis of the aforementioned embodiments, the apparatus further includes:

an email editing interface entering module, configured to: before the hyperlink information of the sharable document and the authority control entry of the sharable document are displayed in the email editing interface, enter the email editing interface through a user's triggering of a mailbox card entry in an instant messaging interface.

The document sharing processing apparatus provided in the embodiment of the present disclosure and the document sharing processing method applied to the email sender client provided in the aforementioned embodiments belong to the same inventive concept. For technical details that have not been described in detail in this embodiment, reference may be made to the aforementioned embodiments. Moreover, this embodiment has the same beneficial effects as those produced when the document sharing processing method is executed.

Embodiment 7

Figure 11:
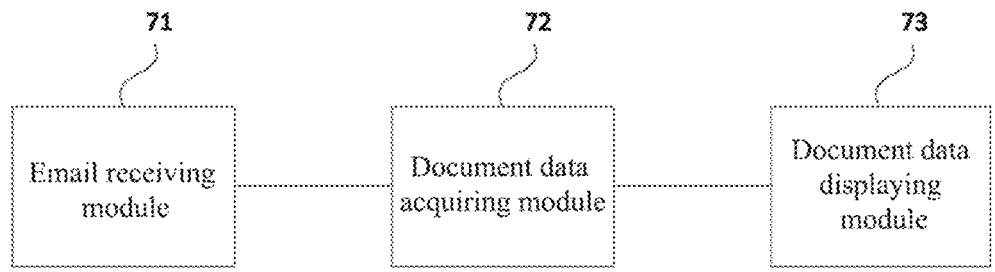
FIG. 11 is a structural diagram of a document sharing processing apparatus provided in Embodiment 7 of the present disclosure.

FIG. 11 is a structural diagram of a document sharing processing apparatus provided in Embodiment 7 of the present disclosure. The apparatus can perform the document sharing processing method in the aforementioned embodiments, and can be configured in an email recipient client. As shown in FIG. 11, the apparatus may include:

an email receiving module 71, configured to receive an email sent by a first user;

a document data acquiring module 72, configured to acquire, according to a hyperlink of the sharable document, document data corresponding to a second user's authority data for the sharable document; and a document data displaying module 73, configured to display, in the email reading interface, associated display content of the hyperlink of the sharable document according to the document data.

In this embodiment, the first user may be a sender user of the email, and the second user may be a recipient user of the email. The document sharing processing apparatus provided in the embodiment of the present disclosure can acquire the document data corresponding to the recipient user's authority data for the sharable document based on the hyperlink of the sharable document in the received email, and display the associated display content of the hyperlink of the sharable document in the email reading interface, so that the recipient user can acquire the corresponding document data within the competence of the authority queried by the document server, thereby fulfilling users' document sharing requirements.

On the basis of the aforementioned embodiments, the document data acquiring module 72 is specifically configured to:

request, according to the hyperlink of the sharable document, the document server to which the sharable document belongs to query and feedback the document data corresponding to the email recipient user's authority data for the sharable document.

On the basis of the aforementioned embodiments, the document data includes basic document information and/or document summary data, and the document data displaying module 73 is specifically configured to:

upon detection of the recipient user's previewing indication for the hyperlink of the sharable document, display the basic document information and/or the document summary data in the email reading interface, for use as preview content.

On the basis of the aforementioned embodiments, the document data includes document content data, and the document data displaying module 73 is specifically configured to:

upon detection of the recipient user's reading indication or editing indication for the hyperlink of the sharable document, display a browsing interface or an editing interface of the document content data in the email reading interface.

On the basis of the aforementioned embodiments, the document data includes document title data, and the document data displaying module 73 is specifically configured to:

display, in the email reading interface, the document title data as the display content of the hyperlink of the sharable document.

On the basis of the aforementioned embodiments, the apparatus further includes:

an access request sending module, configured to: if the acquiring, according to the hyperlink of the sharable document, the email recipient user's document data for the sharable document fails, send a sharable document accessing request to a document server to which the sharable document belongs in response to the recipient user's triggering operation on the hyperlink of the sharable document.

The document sharing processing apparatus provided in the embodiment of the present disclosure and the document sharing processing method applied to the email recipient client provided in the aforementioned embodiments belong to the same inventive concept. For technical details that have not been described in detail in this embodiment, reference may be made to the aforementioned embodiments. Moreover, this embodiment has the same beneficial effects as those produced when the document sharing processing method is executed.

Embodiment 8

Figure 12:
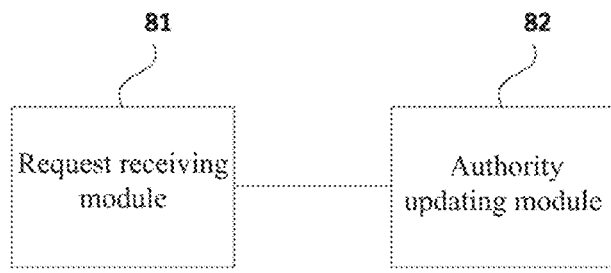
FIG. 12 is a structural diagram of a document sharing processing apparatus provided in Embodiment 8 of the present disclosure.

FIG. 12 is a structural diagram of a document sharing processing apparatus provided in Embodiment 8 of the present disclosure. The apparatus can perform the document sharing processing method in the aforementioned embodiments, and can be configured in a document server client. As shown in FIG. 12, the apparatus may include:

a request receiving module 81, configured to receive an authority editing request for a sharable document initiated by an email client, where the authority editing request is input based on an authority control entry of the sharable document displayed in an email interface; and an authority updating module 82, configured to update authority data of the sharable document according to authority data in the authority editing request.

The document sharing processing apparatus provided in the embodiment of the present disclosure can timely update the authority data of the sharable document according to the authority data in the authority editing request for the sharable document initiated by the email client, so that the recipient user's authority data for the sharable document that is determined by the sender user is timely effective so as to fulfill the sender user's document sharing requirements.

On the basis of the aforementioned embodiments, the apparatus further includes:

an acquiring request receiving module, configured to: before the authority editing request for the sharable document initiated by the email client is received, receive an editable authority data acquiring request for the sharable document initiated by the email client;

a querying module, configured to query, according to a to-be-authorized user in the editable authority data acquiring request, the to-be-authorized user's authority data for the sharable document; and a feeding back module, configured to feedback the authority data to the email client as editable authority data.

On the basis of the aforementioned embodiments, the apparatus further includes:

a verifying module, configured to: before the authority data of the sharable document is updated according to the authority data in the authority editing request, acquire authority data of a user to which the email client belongs, and verify whether the authority data in the authority editing request meets a preset condition; and a determining module, configured to trigger execution of updating the authority data of the sharable document if the authority data in the authority editing request meets the preset condition.

On the basis of the aforementioned embodiments, the authority data includes a user name and a user operation behavior, and the authority data further includes an authority validity period.

The document sharing processing apparatus provided in the embodiment of the present disclosure and the document sharing processing method applied to the document server provided in the aforementioned embodiments belong to the same inventive concept. For technical details that have not been described in detail in this embodiment, reference may be made to the aforementioned embodiments. Moreover, this embodiment has the same beneficial effects as those produced when the document sharing processing method is executed.

Embodiment 9

In the following, reference may be made to FIG. 13 which shows a structural diagram of an electronic device 900 suitable for implementing an embodiment of the present disclosure. The electronic device in the embodiment of the present disclosure is enabled with email sending and receiving functions, and may include, but is not limited to, mobile terminals such as a mobile phone, a notebook computer, a digital broadcast receiver, a PDA (personal digital assistant), a PAD (tablet computer), a PMP (portable multimedia player), an in-vehicle terminal (e.g., an in-vehicle navigation terminal), etc., and stationary terminals such as a digital TV, a desktop computer, etc. The electronic device shown in FIG. 13 is only an example, and should not impose any limitation to the function and usable range of the embodiments of the present disclosure.

Figure 13:
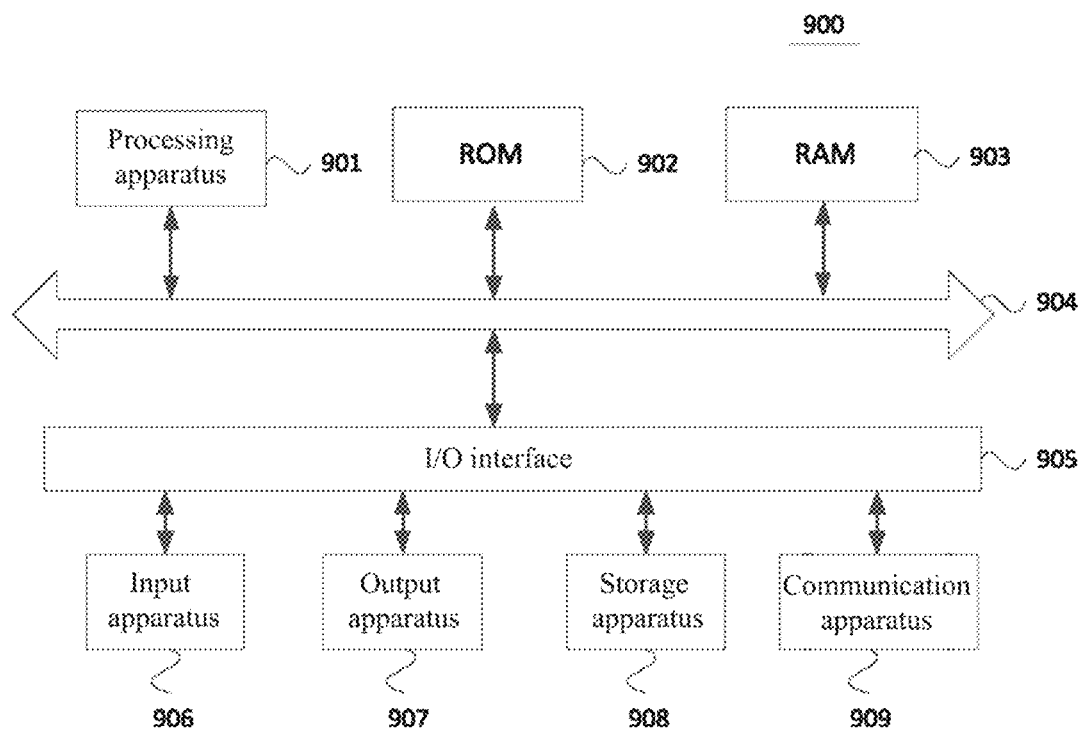
FIG. 13 is a structural diagram of an electronic device provided in Embodiment 9 of the present disclosure.

As shown in FIG. 13, the electronic device 900 may include a processing apparatus (such as a central processing unit, a graphic processing unit, etc.) 901 that may perform various appropriate actions and processes according to a program stored in a read only memory (ROM) 902 or a program loaded from a storage apparatus 908 into a random access memory (RAM) 903. In the RAM 903, various programs and data necessary for operations of the electronic device 900 are also stored. The processing apparatus 901, the ROM 902 and the RAM 903 are connected with each other through a bus 904. An input/output (I/O) interface 905 is also connected to the bus 904.

Generally, the I/O interface 905 may be connected with: an input apparatus 906 including, for example, a touch screen, a touchpad, a keyboard, a mouse, a camera, a microphone, an accelerometer, a gyroscope, etc.; an output apparatus 907 including, for example, a liquid crystal display (LCD), a speaker, a vibrator, etc.; the storage apparatus 908 including, for example, a magnetic tape, a hard disk, etc.; and a communication apparatus 909. The communication apparatus 909 may allow the electronic device 900 to communicate with other devices in a wireless manner or in a wired manner for data exchange. Although FIG. 13 shows the electronic device 900 with various apparatuses, it should be appreciated that it is not necessary to implement or provide all of the illustrated apparatuses. More or fewer apparatuses may alternatively be implemented or provided.

In particular, according to the embodiments of the present disclosure, the processes described above with reference to the flowcharts may be implemented as computer software programs. For example, an embodiment of the present disclosure includes a computer program product including a computer program carried on a non-transitory computer readable medium, where the computer program contains program codes for performing a method illustrated in a flowchart. In such an embodiment, the computer program may be downloaded and installed from a network via the communication apparatus 909, or installed from the storage apparatus 908, or installed from the ROM 902. When the computer program is executed by the processing apparatus 901, steps in a method according to an embodiment of the present disclosure are executed to implement the aforementioned functions defined therein.

An embodiment of the present disclosure further provides a computer program product including a computer program, where the computer program is stored in a readable storage medium from which one or more processors of an electronic device can read the computer program, and the one or more processors execute the computer program to enable the electronic device to implement the solution provided in any of the foregoing embodiments.

An embodiment of the present disclosure further provides a computer program, where the computer program is stored in a readable storage medium from which one or more processors of an electronic device can read the computer program, and the one or more processors execute the computer program to enable the electronic device to implement the solution provided in any of the foregoing embodiments.

Embodiment 10

The computer readable medium described above in the present disclosure may be a computer readable signal medium, or a computer readable storage medium, or any combination thereof. The computer readable storage medium may be, for example, but not limited to, an electrical, magnetic, optical, electromagnetic, infrared, or semiconductor system, apparatus or device, or any combination thereof. More specific examples of the computer readable storage medium may include, but are not limited to, an electrical connection with one or more wires, a portable computer disc, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof In the present disclosure, the computer readable storage medium may be any tangible medium containing or storing a program for use by or in conjunction with an instruction execution system, apparatus, or device. In the present disclosure, however, the computer readable signal medium may include a data signal propagated in a baseband or as part of a carrier wave, in which computer readable program codes are carried. Such propagated data signal may take a variety of forms, including but not limited to an electromagnetic signal, an optical signal, or any suitable combination thereof. The computer readable signal medium may also be any computer readable medium other than the computer readable storage medium. The computer readable signal medium may transmit, propagate, or transport the program for use by or in conjunction with the instruction execution system, apparatus, or device. The program codes contained on the computer readable medium may be transmitted using any suitable medium including, but not limited to, an electrical wire, an optical cable, an RF (radio frequency) and the like, or any suitable combination thereof.

In some embodiments, the client and the server may use any currently known or future developed network protocol such as HTTP (Hyper Text Transfer Protocol) to communicate, and may be interconnected with any form or medium of digital data communications (e.g., a communication network). Examples of the communication network include a local area network ("LAN"), a wide area network ("WAN"), a internet (e.g., Internet), a peer-to-peer network (e.g., an ad hoc peer-to-peer network), and any currently known or future developed network.

The aforementioned computer readable medium may be included in the aforementioned electronic device; or may exist alone without being assembled into the electronic device.

The aforementioned computer readable medium carries one or more programs, where when the aforementioned one or more programs are executed by the electronic device, the electronic device is enabled to: display, in an email editing interface, hyperlink information of a sharable document and an authority control entry of the sharable document; acquire authority data for the sharable document determined by an email sender user based on the authority control entry; where the authority data is used to determine the email recipient user's operation authority data for the sharable document; and send an email edited through the email editing interface to the recipient user.

Alternatively, the aforementioned computer readable medium carries one or more programs, where when the aforementioned one or more programs are executed by the electronic device, the electronic device is enabled to: receive an email sent by an email sender user; acquire, according to a hyperlink of a sharable document in the email, document data corresponding to an email recipient user's authority data for the sharable document; and display, in the email reading interface, associated display content of the hyperlink of the sharable document according to the document data.

Alternatively, the aforementioned computer readable medium carries one or more programs, where when the aforementioned one or more programs are executed by the electronic device, the electronic device is enabled to: receive an authority editing request for a sharable document initiated by an email client, where the authority editing request is input based on an authority control entry of the sharable document displayed in an email editing interface; and update authority data of the sharable document according to authority data in the authority editing request.

Computer program codes for executing operations of the present disclosure may be written in one or more programming languages or combinations thereof, and the aforementioned programming languages include, but are not limited to, object-oriented programming languages—such as Java, Smalltalk, C++, also include conventional procedural programming languages—such as "C" language or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any kind of network, including a local area network (LAN) or a wide area network (WAN), or may be connected to an external computer (e.g., being connected via Internet by using an Internet service provider).

The flowcharts and block diagrams in the drawings illustrate possibly implementable architectures, functionalities, and operations of the system, the method and the computer program product according to the embodiments of the present disclosure. In this regard, each block in the flowcharts or the block diagrams may represent a module, a program segment, or part of codes containing one or more executable instructions for implementing a prescribed logical function. It should also be noted that, in some alternative implementations, the functions marked in the blocks may also occur in an order different from that marked in the drawings. For example, two blocks shown in succession may, in fact, be executed substantially concurrently, or they may sometimes be executed in a reverse order, depending on the functionality involved. It is also to be noted that each block in the block diagrams and/or flowcharts and a combination of the blocks in the block diagrams and/or flowcharts may be implemented using a dedicated hardware-based system that performs a prescribed function or operation, or may be implemented using a combination of dedicated hardware and computer instructions.

The modules described and involved in the embodiments of the present disclosure may be implemented by means of software or hardware. Among them, the name of a module does not constitute a limitation to the module itself under certain circumstances. For example, the control entry displaying module may also be described as "a module for displaying hyperlink information of a sharable document and authority control entry of the sharable document in an email editing interface".

The functions described herein above may be implemented, at least in part, by one or more hardware logic components. For example, non-restrictively, exemplary-typed hardware logic components that may be used include: Field Programmable Gate Arrays (FPGA), Application Specific Integrated Circuits (ASIC), Application Specific Standard Products (ASSP), System-on-Chips (SOC), Complex Programmable Logical Devices (CPLD) and others.

In the context of the present disclosure, a machine readable medium may be a tangible medium that may contain or store a program for use by or in conjunction with an instruction execution system, apparatus or device. The machine readable medium may be a machine readable signal medium or a machine readable storage medium. The machine readable medium may include, but not limited to, an electrical, magnetic, optical, electromagnetic, infrared, or semiconductor system, apparatus or device, or any suitable combination thereof. More specific examples of the machine readable storage medium may include an electrical connection based on one or more wires, a portable computer disc, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

Embodiment 11

Figure 14:
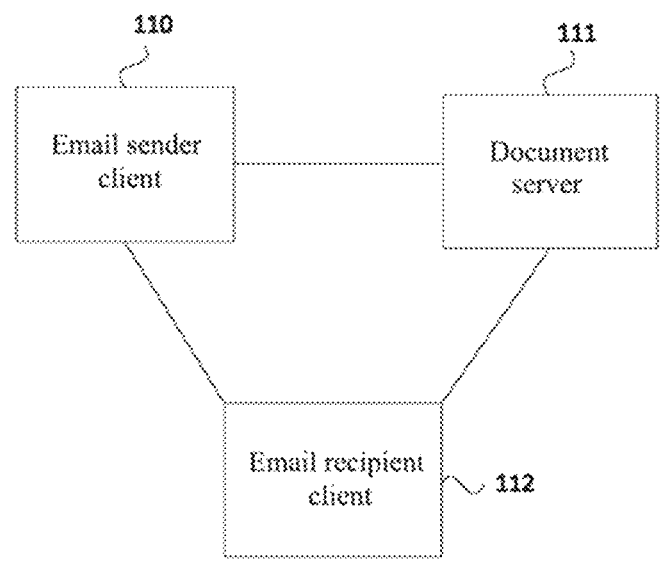
FIG. 14 is a structural diagram of a document sharing processing system provided in Embodiment 11 of the present disclosure.

FIG. 14 is a structural diagram of a document sharing processing system provided in Embodiment 11 of the present disclosure. As shown in FIG. 14, the system includes an email sender client 110, a document server 111, and an email recipient client 112, where:

the email sender client 110 is configured to, display, in an email interface, hyperlink information of a sharable document and an authority control entry of the sharable document; and acquire authority data for the sharable document determined by a first user based on the authority control entry; where the authority data is used to determine a second user's operation authority data for the sharable document;

the email sender client 110 is further configured to send, to the document server 111 to which the sharable document belongs, an authority editing request determined based on the authority data;

the document server 111 is configured to update, according to the authority data in the authority editing request, the second user's operation authority type for the sharable document recorded by the document server 111;

the email sender client 110 is further configured to send an email edited through the email interface to the second user;

the email recipient client 112 is configured to receive the email sent by the first user;

the email recipient client 112 is further configured to request to the document server 111, according to a hyperlink of the sharable document, for acquisition of document data corresponding to the second user's authority data for the sharable document;

the document server 111 is configured to query, according to the requesting from the email recipient client, the second user's authority data for the sharable document, acquire the corresponding document data according to the authority data, and feedback same to the email recipient client 112; and the email recipient client 112 is further configured to display, in an email reading interface, associated display content of the hyperlink of the sharable document according to the document data.

In this embodiment, the first user may be a sender user of the email, and the second user may be a recipient user of the email. The document sharing processing system provided in the embodiment of the present disclosure includes an email sender client, a document server and an email recipient client. Among them, not only hyperlink information of a sharable document but also an authority control entry associated with the hyperlink information of the sharable document can be displayed in an email editable interface of the email sender client, and the email sender client can communicate with the document server through the authority control entry, so that the sender user's authorization to the recipient user and the document server's updating to the authority data of the sharable document are achieved; after the email sender client sends the edited email to the email recipient client, the email recipient client can request to the document server, based on a hyperlink of the sharable document in the received email, for acquisition of document data corresponding to the recipient user's authority data for the sharable document, and display associated display content of the hyperlink of the sharable document in an email reading interface, for reading, sharing or editing by the recipient user. According to the document sharing processing system provided in the embodiment of the present disclosure, a controllable function for the sharable document is added in the email, thereby fulfilling users' document sharing requirement.

In a case where there is no contradiction, the email sender client, the email recipient client and the document server may respectively perform the operations described in the foregoing embodiments. Specifically, the email sender client may perform the operations described above in Embodiments 1 to 3, the email recipient client may perform the operations described above in Embodiment 4, and the document server may perform the operations described above in Embodiment 5.

According to one or more embodiments of the present disclosure, the present disclosure provides a document sharing processing method, including:

displaying, in an email editing interface, hyperlink information of a sharable document and an authority control entry of the sharable document;

acquiring authority data for the sharable document determined by an email sender user based on the authority control entry; where the authority data is used to determine an email recipient user's operation authority data for the sharable document; and sending an email edited through the email editing interface to the recipient user.

According to one or more embodiments of the present disclosure, in the document sharing processing method provided in the present disclosure, the acquiring the authority data for the sharable document determined by the email sender user based on the authority control entry includes:

determining, according to a recipient column of the email, the recipient user, for use as an operation authority object;

acquiring an operation authority type for the sharable document determined by the email sender user based on the authority control entry; and determining the authority data according to the operation authority object and the operation authority type.

According to one or more embodiments of the present disclosure, in the document sharing processing method provided in the present disclosure, the acquiring the authority data for the sharable document determined by the email sender user based on the authority control entry includes:

acquiring an operation authority type and an operation authority object for the sharable document determined by the email sender user based on the authority control entry, for use as the authority data.

According to one or more embodiments of the present disclosure, in the document sharing processing method provided in the present disclosure, after the acquiring the authority data for the sharable document determined by the email sender user based on the authority control entry, the method further includes:

sending the authority data to a document server to which the sharable document belongs to update the recipient user's operation authority data for the sharable document recorded by the document server.

According to one or more embodiments of the present disclosure, in the document sharing processing method provided in the present disclosure, the sending the authority data to the document server to which the sharable document belongs includes:

sending the authority data to the document server to which the sharable document belongs, when the sender user inputs the authority data to a current authority control entry or when the email is confirmed to be sent to the recipient user.

According to one or more embodiments of the present disclosure, in the document sharing processing method provided in the present disclosure, the authority control entry includes a control displayed in association with a hyperlink of the sharable document, and the control is configured to input the authority data.

According to one or more embodiments of the present disclosure, in the document sharing processing method provided in the present disclosure, the control is configured to confirm preset default authority data; where the preset default authority data includes the recipient user's access authority for the sharable document.

According to one or more embodiments of the present disclosure, in the document sharing processing method provided in the present disclosure, the displaying, in the email editing interface, the hyperlink information of the sharable document and the authority control entry of the sharable document includes:

requesting to a document server for acquisition of editable authority data of the sharable document; and displaying, in the email editing interface, the hyperlink information of the sharable document according to the editable authority data returned by the document server, and displaying, in the authority control entry, content of the editable authority data for the sender user to operate the editable authority data.

According to one or more embodiments of the present disclosure, in the document sharing processing method provided in the present disclosure, the requesting to the document server for acquisition of the editable authority data of the sharable document includes:

upon detection of a hyperlink of the sharable document in the email editing interface or detection of an edit activating operation on the authority control entry, requesting to the document server for acquisition of the editable authority data of the sharable document.

According to one or more embodiments of the present disclosure, in the document sharing processing method provided in the present disclosure, the editable authority data includes the recipient user's at least one operation authority type for the sharable document; and the editable authority data includes editable authority data of one or more recipient users.

According to one or more embodiments of the present disclosure, in the document sharing processing method provided in the present disclosure, the method further includes:

upon detection of a hyperlink of the sharable document in the email editing interface, requesting to the document server for acquisition of document data of the sharable document; and displaying, in the email editing interface, associated display content of the hyperlink of the sharable document according to the document data.

According to one or more embodiments of the present disclosure, in the document sharing processing method provided in the present disclosure, the document data includes basic document information and/or document summary data, and the displaying, in the email editing interface, the associated display content of the hyperlink of the sharable document according to the document data includes:

upon detection of the sender user's previewing indication for the hyperlink of the sharable document, displaying the basic document information and/or the document summary data in the email editing interface, for use as preview content.

According to one or more embodiments of the present disclosure, in the document sharing processing method provided in the present disclosure, the document data includes document content data, and the displaying, in the email editing interface, the associated display content of the hyperlink of the sharable document according to the document data includes:

upon detection of the sender user's reading indication or editing indication for the hyperlink of the sharable document, displaying a browsing interface or an editing interface of the document content data in the email editing interface.

According to one or more embodiments of the present disclosure, in the document sharing processing method provided in the present disclosure, the document data includes document title data, and the displaying, in the email editing interface, the associated display content of the hyperlink of the sharable document according to the document data includes:

displaying, in the email editing interface, the document title data as the associated display content of the hyperlink of the sharable document.

According to one or more embodiments of the present disclosure, in the document sharing processing method provided in the present disclosure, before the displaying, in the email editing interface, the hyperlink information of the sharable document and the authority control entry of the sharable document, the method further includes:

entering the email editing interface through a user's triggering of a mailbox card entry in an instant messaging interface.

According to one or more embodiments of the present disclosure, the present disclosure provides a document sharing processing method, including:

receiving an email sent by an email sender user;

acquiring, according to a hyperlink of a sharable document in the email, document data corresponding to an email recipient user's authority data for the sharable document; and displaying, in the email reading interface, associated display content of the hyperlink of the sharable document according to the document data.

According to one or more embodiments of the present disclosure, in the document sharing processing method provided in the present disclosure, the acquiring, according to the hyperlink of the sharable document, the document data corresponding to the email recipient user's authority data for the sharable document includes:

requesting, according to the hyperlink of the sharable document, a document server to which the sharable document belongs to query and feedback the document data corresponding to the email recipient user's authority data for the sharable document.

According to one or more embodiments of the present disclosure, in the document sharing processing method provided in the present disclosure, the document data includes basic document information and/or document summary data, and the displaying, in the email reading interface, the associated display content of the hyperlink of the sharable document according to the document data includes:

upon detection of the recipient user's previewing indication for the hyperlink of the sharable document, displaying the basic document information and/or the document summary data in the email reading interface, for use as preview content.

According to one or more embodiments of the present disclosure, in the document sharing processing method provided in the present disclosure, the document data includes document content data, and the displaying, in the email reading interface, the associated display content of the hyperlink of the sharable document according to the document data includes:

upon detection of the recipient user's reading indication or editing indication for the hyperlink of the sharable document, displaying a browsing interface or an editing interface of the document content data in the email reading interface.

According to one or more embodiments of the present disclosure, in the document sharing processing method provided in the present disclosure, the document data includes document title data, and the displaying, in the email reading interface, the associated display content of the hyperlink of the sharable document according to the document data includes:

displaying, in the email reading interface, the document title data as the display content of the hyperlink of the sharable document.

According to one or more embodiments of the present disclosure, in the document sharing processing method provided in the present disclosure, the method further includes:

if the acquiring, according to the hyperlink of the sharable document, the email recipient user's document data for the sharable document fails, sending a sharable document accessing request to a document server to which the sharable document belongs in response to the recipient user's triggering operation on the hyperlink of the sharable document.

According to one or more embodiments of the present disclosure, the present disclosure provides a document sharing processing method, including:

receiving an authority editing request for a sharable document initiated by an email client, where the authority editing request is input based on an authority control entry of the sharable document displayed in an email editing interface; and updating authority data of the sharable document according to authority data in the authority editing request.

According to one or more embodiments of the present disclosure, in the document sharing processing method provided in the present disclosure, before the receiving the authority editing request for the sharable document initiated by the email client, the method further includes:

receiving an editable authority data acquiring request for the sharable document initiated by the email client;

querying, according to a to-be-authorized user in the editable authority data acquiring request, the to-be-authorized user's authority data for the sharable document; and feeding back the authority data to the email client as editable authority data.

According to one or more embodiments of the present disclosure, in the document sharing processing method provided in the present disclosure, before the updating the authority data of the sharable document according to the authority data in the authority editing request, the method further includes:

acquiring authority data of a user to which the email client belongs, and verifying whether the authority data in the authority editing request meets a preset condition; and triggering execution of updating the authority data of the sharable document if the authority data in the authority editing request meets the preset condition.

According to one or more embodiments of the present disclosure, in the document sharing processing method provided in the present disclosure, the authority data includes a user name and a user operation behavior, and the authority data further includes an authority validity period.

According to one or more embodiments of the present disclosure, the present disclosure provides a document sharing processing apparatus, including:

a control entry displaying module, configured to display, in an email editing interface, hyperlink information of a sharable document and an authority control entry of the sharable document;

an authority data acquiring module, configured to acquire authority data for the sharable document determined by an email sender user based on the authority control entry; where the authority data is used to determine an email recipient user's operation authority data for the sharable document; and an email sending module, configured to send an email edited through the email editing interface to the recipient user.

According to one or more embodiments of the present disclosure, the present disclosure provides a document sharing processing apparatus, including:

an email receiving module, configured to receive an email sent by an email sender user;

a document data acquiring module, configured to acquire, according to a hyperlink of the sharable document, document data corresponding to an email recipient user's authority data for the sharable document; and a document data displaying module, configured to display, in the email reading interface, associated display content of the hyperlink of the sharable document according to the document data.

According to one or more embodiments of the present disclosure, the present disclosure provides a document sharing processing apparatus, including:

a request receiving module, configured to receive an authority editing request for a sharable document initiated by an email client, where the authority editing request is input based on an authority control entry of the sharable document displayed in an email editing interface; and an authority updating module, configured to update authority data of the sharable document according to authority data in the authority editing request.

According to one or more embodiments of the present disclosure, the present disclosure provides an electronic device, including:

one or more processors; and a memory configured to store one or more programs, where the one or more programs, when executed by the one or more processors, cause the one or more processors to implement any document sharing processing method provided in the present disclosure.

According to one or more embodiments of the present disclosure, the present disclosure provides a computer readable storage medium on which a computer program is stored, where when the program is executed by a processor, any document sharing processing method provided in the present disclosure is implemented.

According to one or more embodiments of the present disclosure, the present disclosure provides a document sharing processing system, including: an email sender client, a document server and an email recipient client, where:

the email sender client is configured to, display, in an email editing interface, hyperlink information of a sharable document and an authority control entry of the sharable document; and acquire authority data for the sharable document determined by an email sender user based on the authority control entry; where the authority data is used to determine an email recipient user's operation authority data for the sharable document;

the email sender client is further configured to send, to the document server to which the sharable document belongs, an authority editing request determined based on the authority data;

the document server is configured to update, according to the authority data in the authority editing request, the recipient user's operation authority type for the sharable document recorded by the document server;

the email sender client is further configured to send an email edited through the email editing interface to the recipient user;

the email recipient client is configured to receive the email sent by the email sender user;

the email recipient client is further configured to request to the document server, according to a hyperlink of the sharable document, for acquisition of document data corresponding to the email recipient user's authority data for the sharable document;

the document server is configured to query, according to the requesting from the email recipient client, the recipient user's authority data for the sharable document, acquire the corresponding document data according to the authority data, and feedback same to the email recipient client; and the email recipient client is further configured to display, in the email reading interface, associated display content of the hyperlink of the sharable document according to the document data.

The above description is merely a preferred embodiment of the present disclosure and an illustration of the technical principles employed. Those skilled in the art should appreciated that the scope of disclosure involved in the present disclosure is not limited to a technical solution formed by a specific combination of the aforementioned technical features, but should also cover other technical solutions formed by any combination of the aforementioned technical features or equivalent features thereof, without departing from the aforementioned disclosure concepts, such as a technical solution formed by replacing the aforementioned features with the technical features disclosed in the present disclosure (but not limited to) that have similar functions.

Additionally, although various operations are depicted in a particular order, this should not be construed as these operations being required to be performed in the depicted particular order or in a sequential order. Under certain circumstances, multitasking and parallel processing may be advantageous. Likewise, although the above discussion contains several specific implementation details, these details should not be construed as limitations to the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or logical actions of the method, it should be appreciated that the subject matter defined in the appended claims is not necessarily limited to the specific features or actions described above. Rather, the specific features and actions described above are merely example forms for implementing the claims.

What is claimed is:

1. A document sharing processing method, comprising:
displaying, in an email editing interface, hyperlink information of a sharable document and an authority control entry of the sharable document, wherein the hyperlink information of the sharable document is an anchor text link, text in the anchor text link represents a title of the sharable document, the authority control entry comprises an operation authority type entry and an operation authority object entry, the operation authority type is acquired through the operation authority type entry, and the operation authority object is acquired through the operation authority object entry;
acquiring authority data for the sharable document determined by a first user based on the authority control entry; wherein the authority data is used to determine a second user's operation authority data for the sharable document, the operation authority data comprises an operation authority type for the sharable document, and the operation authority type comprises a reading authority, a sharing authority, and an editing authority for the sharable document; and
sending an email edited through the email editing interface to the second user.

2. The method according to claim 1, wherein the first user comprises a sender user of the email, and the second user comprises a recipient user of the email; or
the first user comprises a co-editing initiator who sends a document link to a draft email, and the second user comprises a co-editing recipient.

3. The method according to claim 1, wherein if there are multiple second users, the acquiring the authority data for the sharable document determined by the first user based on the authority control entry comprises:
setting a same operation authority type for the respective second users based on the first user's operation on the authority control entry; or
setting operation authority types for the respective second users respectively based on the first user's operations on the authority control entry that respectively correspond to the respective second users.

4. The method according to claim 1, wherein the acquiring the authority data for the sharable document determined by the first user based on the authority control entry comprises at least one of following steps:
a step of determining, according to an email address in a second user column, the second user, for use as an operation authority object, acquiring the operation authority type for the sharable document determined by the first user based on the authority control entry, and determining the authority data according to the operation authority object and the operation authority type; and
a step of acquiring the operation authority type and an operation authority object for the sharable document determined by the first user based on the authority control entry, for use as the authority data.

5. The method according to claim 1, after the acquiring the authority data for the sharable document determined by the first user based on the authority control entry, further comprising:
sending the authority data to a document server to which the sharable document belongs to update the recipient user's operation authority data for the sharable document recorded by the document server;
wherein the sending the authority data to the document server to which the sharable document belongs comprises:
sending the authority data to the document server to which the sharable document belongs, when the first user inputs the authority data to a current authority control entry or when the email is confirmed to be sent to the second user.

6. The method according to claim 1, wherein the authority control entry comprises a control displayed in association with a hyperlink of the sharable document, and the control is configured to input the authority data.

7. The method according to claim 6, wherein the control is configured to confirm preset default authority data; wherein the preset default authority data comprises the second user's access authority for the sharable document.

8. The method according to claim 1, wherein the displaying, in the email editing interface, the hyperlink information of the sharable document and the authority control entry of the sharable document comprises:
requesting to a document server for acquisition of editable authority data of the sharable document; and
displaying, in the email editing interface, the hyperlink information of the sharable document according to the editable authority data returned by the document server, and displaying, in the authority control entry, content of the editable authority data for the first user to operate the editable authority data.

9. The method according to claim 8, wherein the requesting to the document server for acquisition of the editable authority data of the sharable document comprises:
upon detection of a hyperlink of the sharable document in the email editing interface or detection of an edit activating operation on the authority control entry, requesting to the document server for acquisition of the editable authority data of the sharable document.

10. The method according to claim 8, wherein:
the editable authority data comprises the second user's at least one operation authority type for the sharable document; and
the editable authority data comprises editable authority data of one or more second users.

11. The method according to claim 1, further comprising:
upon detection of a hyperlink of the sharable document in the email editing interface, requesting to the document server for acquisition of document data of the sharable document; and
displaying, in the email interface, associated display content of the hyperlink of the sharable document according to the document data.

12. The method according to claim 11, wherein the document data comprises basic document information and/or document summary data, and the displaying, in the email editing interface, the associated display content of the hyperlink of the sharable document according to the document data comprises:
upon detection of the first user's previewing indication for the hyperlink of the sharable document, displaying the basic document information and/or the document summary data in the email editing interface, for use as preview content.

13. The method according to claim 11, wherein the document data comprises document content data, and the displaying, in the email editing interface, the associated display content of the hyperlink of the sharable document according to the document data comprises:
upon detection of the first user's reading indication or editing indication for the hyperlink of the sharable document, displaying a browsing interface or an editing interface of the document content data in the email editing interface; or
the document data comprises document title data, and the displaying, in the email editing interface, the associated display content of the hyperlink of the sharable document according to the document data comprises:
displaying, in the email editing interface, the document title data as the associated display content of the hyperlink of the sharable document.

14. The method according to claim 1, before the displaying, in the email editing interface, the hyperlink information of the sharable document and the authority control entry of the sharable document, further comprising:
entering the email editing interface through a user's triggering of a mailbox entry in an instant messaging interface.

15. A document sharing processing method, comprising:
receiving an email sent by a first user, wherein displaying an authority control entry of the sharable document in an editing interface of the email, the authority control entry comprises an operation authority type entry and an operation authority object entry, the operation authority type is acquired through the operation authority type entry, and the operation authority object is acquired through the operation authority object entry;
acquiring, according to a hyperlink of a sharable document in the email, document data corresponding to a second user's authority data for the sharable document, wherein the authority data is used to determine a second user's operation authority data for the sharable document, the operation authority data comprises an authority validity period, an authority expiration condition, and an operation authority type for the sharable document, and the operation authority type comprises a reading authority, a sharing authority, and an editing authority for the sharable document; and
displaying, in an email reading interface, associated display content of the hyperlink of the sharable document according to the document data.

16. The method according to claim 15, wherein the acquiring, according to the hyperlink of the sharable document, the document data corresponding to the email second user's authority data for the sharable document comprises:
requesting, according to the hyperlink of the sharable document, a document server to which the sharable document belongs to query and feedback the document data corresponding to the second user's authority data for the sharable document.

17. The method according to claim 15, further comprising:
if the acquiring, according to the hyperlink of the sharable document, the second user's document data for the sharable document fails, sending a sharable document accessing request to a document server to which the sharable document belongs in response to the second user's triggering operation on the hyperlink of the sharable document.

18. An electronic device, comprising:
one or more processors; and
a memory configured to store one or more programs, wherein the one or more programs, when executed by the one or more processors, cause the one or more processors to:

display, in an email editing interface, hyperlink information of a sharable document and an authority control entry of the sharable document, wherein the hyperlink information of the sharable document is an anchor text link, text in the anchor text link represents a title of the sharable document, the authority control entry comprises an operation authority type entry and an operation authority object entry, the operation authority type is acquired through the operation authority type entry, and the operation authority object is acquired through the operation authority object entry;

acquire authority data for the sharable document determined by a first user based on the authority control entry; wherein the authority data is used to determine a second user's operation authority data for the sharable document, the operation authority data comprises an operation authority type for the sharable document, and the operation authority type comprises a reading authority for the sharable document, a sharing authority, and an editing authority; and send an email edited through the email editing interface to the second user.

* * * * *